United States Patent
Alsup et al.

(10) Patent No.: US 7,133,969 B2
(45) Date of Patent: Nov. 7, 2006

(54) SYSTEM AND METHOD FOR HANDLING EXCEPTIONAL INSTRUCTIONS IN A TRACE CACHE BASED PROCESSOR

(75) Inventors: Mitchell Alsup, Austin, TX (US); Gregory William Smaus, Austin, TX (US); James K. Pickett, Austin, TX (US); Brian D. McMinn, Buda, TX (US); Michael A. Filippo, Manchaca, TX (US); Benjamin T. Sander, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 436 days.

(21) Appl. No.: 10/676,437

(22) Filed: Oct. 1, 2003

(65) Prior Publication Data
US 2005/0076180 A1    Apr. 7, 2005

(51) Int. Cl.
*G06F 13/00* (2006.01)
*G06F 12/00* (2006.01)
(52) U.S. Cl. .................. 711/125; 711/119; 711/129; 711/135; 711/137; 712/233; 712/244
(58) Field of Classification Search ................ 712/235, 712/239, 244, 214, 208, 233; 711/119, 125, 711/135, 137
See application file for complete search history.

(56) References Cited

U.S. PATENT DOCUMENTS

| | | | |
|---|---|---|---|
| 3,896,419 A | 7/1975 | Lange et al. | |
| 5,381,533 A | 1/1995 | Peleg | |
| 5,930,497 A | 7/1999 | Cherian et al. | |
| 6,167,536 A * | 12/2000 | Mann | 714/45 |
| 6,185,675 B1 | 2/2001 | Kranich et al. | |
| 6,247,121 B1 | 6/2001 | Akkary et al. | |
| 6,256,727 B1 | 7/2001 | McDonald | |
| 6,339,822 B1 | 1/2002 | Miller | |
| 6,345,295 B1 | 2/2002 | Beardsley et al. | |
| 6,357,016 B1 * | 3/2002 | Rodgers et al. | 713/601 |
| 6,449,714 B1 | 9/2002 | Sinharoy | |
| 6,578,128 B1 | 6/2003 | Arsenault et al. | |
| 6,823,428 B1 | 11/2004 | Rodriguez et al. | |
| 6,973,543 B1 | 12/2005 | Hughes | |
| 7,003,629 B1 * | 2/2006 | Alsup | 711/118 |
| 2002/0144101 A1 * | 10/2002 | Wang et al. | 712/240 |

(Continued)

FOREIGN PATENT DOCUMENTS

EP          0 957 428         11/1999

(Continued)

OTHER PUBLICATIONS

Yuan Chou, et al., "Instruction Path Coprocessors," Mar. 2000, pp. 1-24.

(Continued)

*Primary Examiner*—Hong Kim
(74) *Attorney, Agent, or Firm*—Robert C. Kowert; Meyertons, Hood, Kivlin, Kowert & Goetzel, P.C.

(57) ABSTRACT

A system may include an instruction cache, a trace cache including a plurality of trace cache entries, and a trace generator coupled to the instruction cache and the trace cache. The trace generator may be configured to receive a group of instructions output by the instruction cache for storage in one of the plurality of trace cache entries. The trace generator may be configured to detect an exceptional instruction within the group of instructions and to prevent the exceptional instruction from being stored in a same one of the plurality of trace cache entries as any non-exceptional instruction.

30 Claims, 7 Drawing Sheets

U.S. PATENT DOCUMENTS

| | | | |
|---|---|---|---|
| 2003/0023835 A1* | 1/2003 | Kalafatis et al. | 712/214 |
| 2004/0083352 A1* | 4/2004 | Lee | 712/237 |
| 2004/0143721 A1 | 7/2004 | Pickett et al. | |
| 2004/0193857 A1* | 9/2004 | Miller et al. | 712/240 |
| 2005/0125632 A1* | 6/2005 | Alsup et al. | 712/207 |

FOREIGN PATENT DOCUMENTS

| | | |
|---|---|---|
| GB | 2381101 | 4/2003 |

OTHER PUBLICATIONS

Friendly, et al., "Putting the Fill Unit to Work: Dynamic Organizations for Trace Cache Microprocessors," Dept. of Electrical Engineering and Computer Sciences, The Univ. of Michigan, Dec. 1998, 9 pages.

Bryan Black, et al., "Turboscalar: A High Frequency High IPC Microarchitecture," Dept. of Electrical and Computer Engineering, Carnegie Mellon Univ., Jun. 2000, pp. 1-21.

Rotenberg, et al., "Trace Cache: A Low Latency Approach to High Bandwidth Instruction Fetching," Apr. 11, 1996, pp. 1-48.

Merten, et al., "An Architectural Framework for Run-Time Optimization," Jun. 2001, pp. 1-43.

Jourdan, et al., "Increasing the Instruction-Level Parallelism through Data-Flow Manipulation," Intel, 11 pages.

Hinton, G., et al., "A 0.18-MUM CMOS IA-32 Processor with a 4-GHZ Integer Execution Unit," IEEE Journal of Solid-State Circuits, vol. 36, No. 11, Nov. 2001, pp. 1617-1627.

Sanjay J. Patel, et al., "replay: A Hardware Framework for Dynamic Optimization," IEEE, vol. 50, No. 6, Jun. 2001, pp. 590-608.

Jacobson, et al., "Instruction Pre-Processing in Trace Processors," IEEE Xplore, Jan. 1999, 6 pages.

Bryan Black, et al., "The Block-Based Trace Cache," IEEE, 1999, pp. 196-207.

Rotenberg, et al., "Trace Cache: a Low Latency Approach to High Bandwidth Instruction Fetching," IEEE, 1996, pp. 24-34.

Grant Braught, "Clas #21—Assemblers, Labels & Pseudo Instructions," Dickenson College, Fall Semester 2000, 6 pages.

Patterson, et al., "Computer Architecture A Quantitative Approach," Second Edition, Morgan Kaufmann Publishers, Inc., 1996, pp. 271-278.

Palmer, et al., "Fido: A Cache That Learns to Fetch," Proceedings of the 17th International Conference on Very Large Data Bases, Barcelona, Sep. 1991, pp. 255-264.

Chen et al., "Eviction Based Cache Placement for Storage Caches," USENIX 2003 Annual Technical Conference, (13 pages).

International Search Report and Written Opinion, PCT/US2004/020721, mailed Apr. 4, 2006, 10 pages.

* cited by examiner

| Liveness | Encoding 266 |
|---|---|
| Unconditionally Live | 11 |
| Subsequent to 1st Branch | 10 |
| Subsequent to 2nd Branch | 01 |
| Unconditionally Dead | 00 |

SYSTEM AND METHOD FOR HANDLING EXCEPTIONAL INSTRUCTIONS IN A TRACE CACHE BASED PROCESSOR

BACKGROUND OF THE INVENTION

1. Field of the Invention

This invention is related to the field of processors, and more particularly, to processors having trace caches.

2. Description of the Related Art

Instructions processed in a processor are encoded as a sequence of ones and zeros. For some processor architectures, instructions may be encoded with a fixed length, such as a certain number of bytes. For other architectures, such as the x86 architecture, the length of instructions may vary. The x86 processor architecture specifies a variable length instruction set (i.e., an instruction set in which various instructions are each specified by differing numbers of bytes). For example, the 80386 and later versions of x86 processors employ between 1 and 15 bytes to specify a particular instruction. Instructions have an opcode, which may be 1–2 bytes, and additional bytes may be added to specify addressing modes, operands, and additional details regarding the instruction to be executed.

In some processor architectures, each instruction may be decoded into one or more simpler operations prior to execution. Decoding an instruction may also involve accessing a register renaming map in order to determine the physical register to which each logical register in the instruction maps and/or to allocate a physical register to store the result of the instruction.

Instructions may be fetched into the decode portion of a processor based, in part, on branch predictions made within the processor. In general, the bandwidth of the instruction fetch and decode portions of a processor may determine whether the execution cores are fully utilized during each execution cycle. Accordingly, it is desirable to be able to provide enough bandwidth in the instruction fetch and decode portions of the processor to kept the execution core as fully supplied with work as possible.

SUMMARY

Various embodiments of methods and systems for handling exceptional instructions within a trace-cache based processor are disclosed. In some embodiments, a system may include an instruction cache, a trace cache including a plurality of trace cache entries, and a trace generator coupled to the instruction cache and the trace cache. The trace generator may be configured to receive a group of instructions output by the instruction cache for storage in one of the plurality of trace cache entries. The trace generator may be configured to detect an exceptional instruction within the group of instructions and to prevent the exceptional instruction from being stored in a same one of the plurality of trace cache entries as any non-exceptional instruction. In one embodiment, the trace generator may be configured to not store the exceptional instruction in the trace cache at all. In another embodiment, the trace generator may be configured to store the exceptional instruction in a different trace cache entry than the one or more other instructions and to not store any other instructions with the exceptional instruction in the different trace cache entry. The trace generator may be configured to store instructions in the trace cache in at least partially decoded form.

The system may also include a retire queue coupled to retire executed instructions. The retire queue may be configured to prevent retirement of any instruction fetched from the trace cache until all instructions included in a same trace cache entry as that instruction are ready for retirement. Alternatively, the retire queue may be configured to prevent retirement of any instruction fetched from the trace cache until all instructions included in a same liveness group within a same trace cache entry as that instruction are ready for retirement.

The system may include restart logic configured to monitor the number of cycles elapsed since the retire queue last retired an instruction. If the number of cycles exceeds a threshold number, the restart logic may be configured to flush a processing pipeline executing instructions fetched from the trace cache and to restart execution from the instruction cache.

A dispatch unit included in the system may be configured to dispatch instructions received from the trace cache. The dispatch unit may be configured to detect a non-re-executable instruction within a group of instructions received from the trace cache and to provide an indication of the non-re-executable instruction to the restart logic. In response to the indication, the restart logic may be configured to flush the processing pipeline and to restart execution from the instruction cache prior to execution of the non-re-executable instruction.

The dispatch unit may be configured to detect the exceptional instruction within a group of instructions received from the instruction cache and to provide an indication of the exceptional instruction to the trace generator, causing the trace generator to detect the exceptional instruction. The trace generator may also be configured to detect exceptional instructions in response to one or more characteristics (e.g., opcodes, addressing modes, etc.) of the exceptional instructions.

In some embodiments, a method may involve: receiving a group of instructions for storage in a trace cache entry within a trace cache; storing one or more instructions included in the group of instructions in the trace cache entry; detecting an exceptional instruction within the group of instructions; and in response to said detecting, not storing the exceptional instruction within the trace cache entry with the one or more instructions.

BRIEF DESCRIPTION OF THE DRAWINGS

A better understanding of the present invention can be obtained when the following detailed description is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

Figure 1:
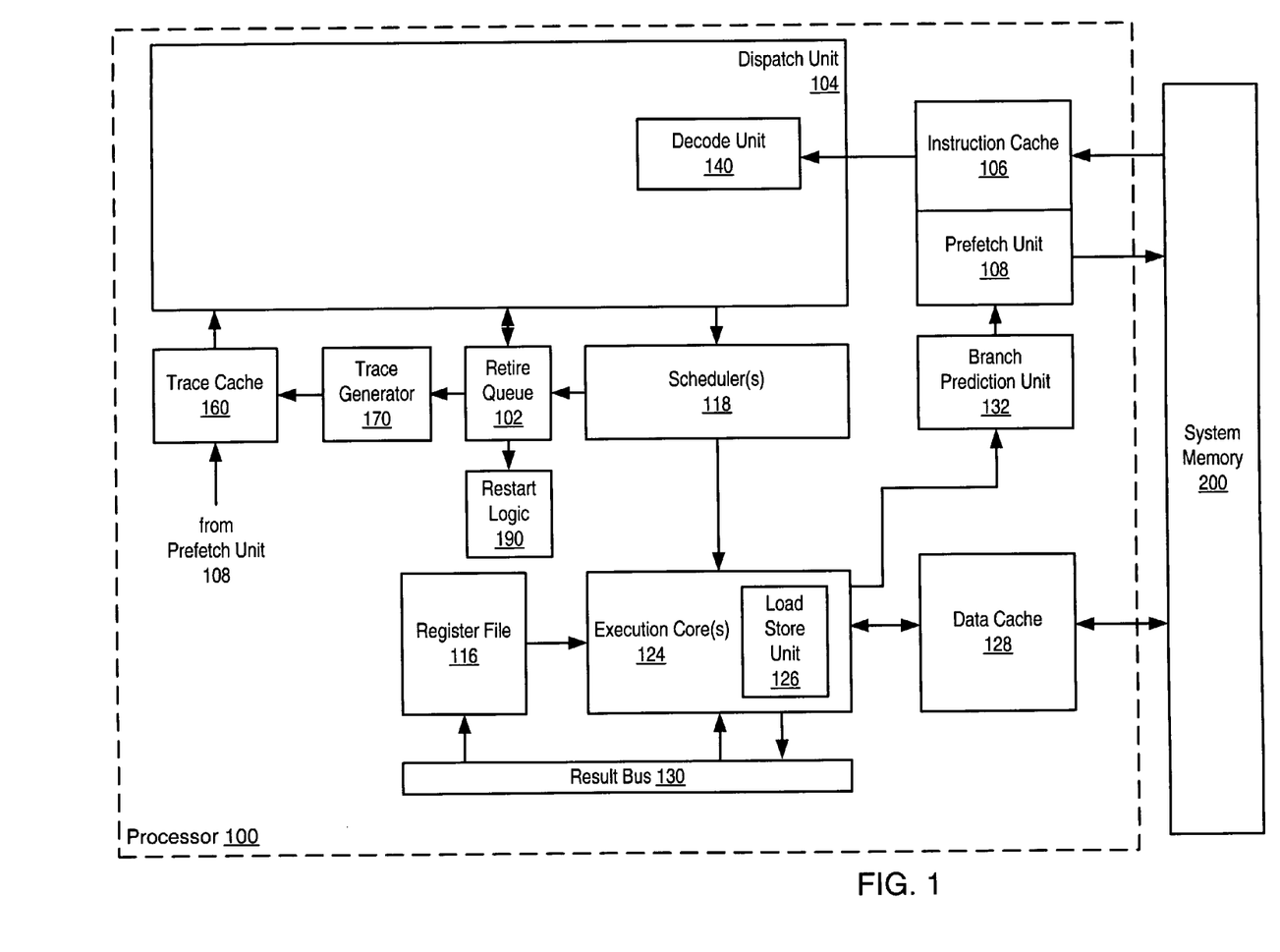
FIG. 1 shows one embodiment of a processor.

FIG. 1 is a block diagram of logical components included in one embodiment of a processor 100. Processor 100 is configured to execute instructions stored in a system memory 200. Many of these instructions operate on data stored in system memory 200, which may be physically distributed throughout a computer system and accessed by one or more processors 100. In some embodiments, the processor 100 may be designed to be compatible with the x86 architecture.

Processor 100 may include an instruction cache 106 and a data cache 128. Processor 100 may include a prefetch unit 108 coupled to the system memory 200. Prefetch unit 108 may prefetch instruction code from the system memory 200 for storage within instruction cache 106. In one embodiment, prefetch unit 108 may be configured to burst code from the system memory 200 into instruction cache 106. Prefetch unit 108 may employ a variety of specific code prefetching techniques and algorithms. Prefetch unit 108 may also fetch instructions from instruction cache 106 and traces from trace cache 160 into dispatch unit 104. Instructions may be fetched from instruction cache 106 in response to a given instruction address missing in trace cache 160. Likewise, instructions may be fetched from system memory 200 in response to a given address missing in instruction cache 106.

A dispatch unit 104 may be configured to receive instructions from instruction cache 106 and to receive decoded and/or partially decoded instructions from trace cache 160. The dispatch unit 104 may include a decode unit 140 to decode instructions received from instruction cache 106. The dispatch unit 104 may also include a microcode unit for use when handling microcoded instructions.

The dispatch unit 104 is configured to dispatch decoded instructions to scheduler(s) 118. One or more schedulers 118 may be coupled to receive dispatched instructions from dispatch unit 104 and to issue instructions to one or more execution cores 124. Execution core(s) 124 may include a load store unit 126 configured to perform accesses to data cache 128. Results generated by execution core(s) 124 may be output to a result bus 130. These results may be used as operand values for subsequently issued instructions and/or stored to register file 116. A retire queue 102 may be coupled to scheduler(s) 118 and dispatch unit 104. The retire queue may be configured to determine when each issued instruction may be retired.

Instruction cache 106 may temporarily store instructions prior to their receipt by dispatch unit 104. Instruction code may be provided to instruction cache 106 by prefetching code from the system memory 200 through prefetch unit 108. Instruction cache 106 may be implemented in various configurations (e.g., set-associative, fully-associative, or direct-mapped).

As used herein, the term instruction may generally refer to non-decoded, partially decoded, and fully decoded instructions. Partially and fully decoded instructions may also be referred to as operations. For example, a non-decoded instruction may be described as being decoded by decode unit 140 into one or more component operations directly executable in execution core(s) 124. Dispatch unit 104 may output signals including bit-encoded operations executable by the execution core 124 as well as operand address information, immediate data and/or displacement data. Upon receiving an instruction that involves the update of a register, the dispatch unit 104 may reserve a register location within register file 116 to store speculative register states (in an alternative embodiment, a reorder buffer may be used to store one or more speculative register states for each register). A register map may translate logical register names of source and destination operands to physical register names in order to facilitate register renaming. Such a register map may track which registers within register file 116 are currently allocated and unallocated.

When instructions are handled by dispatch unit 104, if a required operand is a register location, register address information may be routed to a register map or a reorder buffer. For example, in the x86 architecture, there are eight 32-bit logical registers (e.g., EAX, EBX, ECX, EDX, EBP, ESI, EDI and ESP). Physical register file 116 (or a reorder buffer) includes storage for results that change the contents of these logical registers, allowing out of order execution. A physical register in register file 116 may be allocated to store the result of each instruction that modifies the contents of one of the logical registers. Therefore, at various points during execution of a particular program, register file 116 (or, in alternative embodiments, a reorder buffer) may have one or more registers that contain the speculatively executed contents of a given logical register.

A register map may assign a physical register to a particular logical register specified as a destination operand for an instruction. Register file 116 may have one or more previously allocated physical registers assigned to a logical register specified as a source operand in a given instruction. The register map may provide a tag for the physical register most recently assigned to that logical register. This tag may be used to access the operand's data value in the register file 116 or to receive the data value via result forwarding on the result bus 130. If the operand corresponds to a memory location, the operand value may be provided on the result bus (for result forwarding and/or storage in register file 116) through load store unit 126. Operand data values may be provided to execution core(s) 124 when the instruction is issued by one of the scheduler(s) 118. Note that in alternative embodiments, operand values may be provided to a corresponding scheduler 118 when an instruction is dispatched (instead of being provided to a corresponding execution core 124 when the instruction is issued).

The processor 100 of FIG. 1 supports out of order execution. A retire queue 102 (or, alternatively, a reorder buffer) may keep track of the original program sequence for register read and write operations, allow for speculative instruction execution and branch misprediction recovery, and facilitate precise exceptions. In many embodiments, retire queue 102 may function similarly to a reorder buffer. However, unlike a typical reorder buffer, retire queue 102 may not provide any data value storage. In alternative embodiments, retire queue 102 may function more like a reorder buffer and also support register renaming by providing data value storage for speculative register states. In some embodiments, retire queue 102 may be implemented in a first-in-first-out configuration in which operations move to the "bottom" of the buffer as they are validated, thus making room for new entries at the "top" of the queue. As instructions are retired, retire queue 102 may deallocate registers in register file 116 that are no longer needed to store speculative register states and provide signals to a register map indicating which registers are currently free. By maintaining speculative register states within register file 116 (or, in alternative embodiments, within a reorder buffer) until the instructions that generated those states are validated, the results of speculatively-executed instructions along a mispredicted path may be invalidated in the register file 116 if a branch prediction is incorrect.

The bit-encoded operations and immediate data provided at the outputs of dispatch unit 104 may be routed to one or more schedulers 118. Note that as used herein, a scheduler is a device that detects when instructions are ready for execution and issues ready instructions to one or more execution units. For example, a reservation station is a type of scheduler. Each scheduler 118 may be capable of holding instruction information (e.g., bit encoded execution bits as well as operand values, operand tags, and/or immediate data) for several pending instructions awaiting issue to an execution core 124. In some embodiments, each scheduler 118 may not provide operand value storage. Instead, each scheduler may monitor issued instructions and results available in register file 116 in order to determine when operand values will be available to be read by execution core(s) 124 (from register file 116 or result bus 130). In some embodiments, each scheduler 118 may be associated with a dedicated functional unit (e.g., integer unit, floating point unit, load store unit, etc.) and/or execution core 124. In other embodiments, a single scheduler 118 may issue instructions to more than one recipient.

Schedulers 118 may be provided to temporarily store operation information to be executed by the execution core(s) 124. Instructions are issued to execution core(s) 124 for execution in response to the values of any required operand(s) being made available in time for execution. Accordingly, the order in which instructions are executed may not be the same as the order of the original program instruction sequence.

In one embodiment, each of the execution core(s) 124 may include functional units such as an integer unit configured to perform integer arithmetic operations of addition and subtraction, as well as shifts, rotates, logical operations, and branch operations. A floating point unit may also be included to accommodate floating point operations. One or more of the execution core(s) 124 may be configured to perform address generation for load and store memory operations to be performed by load store unit 126.

The execution core(s) 124 may also provide information regarding the execution of conditional branch instructions to branch prediction unit 132. If information from the execution core 124 indicates that a branch prediction is incorrect, the branch prediction unit 132 may flush instructions subsequent to the mispredicted branch that have entered the instruction processing pipeline and redirect prefetch unit 108. The redirected prefetch unit 108 may then begin fetching the correct set of instructions from instruction cache 106, trace cache 160, and/or system memory 200. In such situations, the results of instructions in the original program sequence that occurred after the mispredicted branch instruction may be discarded, including those which were speculatively executed and temporarily stored in load store unit 126 and/or register file 116.

Results produced by components within execution core(s) 124 may be output on the result bus 130 to the register file 116 if a register value is being updated. If the contents of a memory location are being changed, the results produced within execution core(s) 124 may be provided to the load store unit 126.

Load store unit 126 provides an interface between execution core(s) 124 and data cache 128. In one embodiment, load store unit 126 may be configured with a load store buffer with several storage locations for data and address information for pending loads or stores. The load store unit 126 may also perform dependency checking for load instructions against pending store instructions to ensure that data coherency is maintained.

Data cache 128 is a cache memory provided to temporarily store data being transferred between load store unit 126 and the system memory 200. Like the instruction cache 106 described above, the data cache 128 may be implemented in a variety of specific memory configurations, including a set associative configuration. Additionally, data cache 106 and instruction cache 128 may be implemented in a unified cache in some embodiments.

Retire queue 102 may provide signals identifying program traces to trace generator 170. Trace generator 170 may also be described as a fill unit. Trace generator 170 may store traces identified by retire queue 102 into trace cache 160. Each trace may include instructions that stored in an order other than program order and that are part of several different basic blocks. A basic block is a set of instructions that will either all be executed or all not be executed. In other words, if any instruction in a basic block is executed, all of the other instructions in that basic block will also be executed. An example of a basic block is a set of instructions that begins just after a branch instruction and ends with another branch instruction. The traces stored into trace cache 160 may include decoded or partially decoded instructions in some embodiments. As used herein, a "trace" is a group of instructions that are stored within a single trace cache entry (e.g., a single row or line) in the trace cache 160. All of the information in an entry may be accessed at the same time (e.g., in response to assertion of a trace cache read cycle). Note that in alternative embodiments, trace generator 170 may be coupled to the front-end of the processor (e.g., before or after the dispatch unit) and configured to generate traces in response to instructions being fetched and/or dispatched.

Prefetch unit 108 may fetch instructions from trace cache 160 into dispatch unit 104. Fetching instructions from trace cache 160 may provide improved fetch performance across branch boundaries relative to fetching from instruction cache 106. For example, if a branch is predicted taken, instructions in the predicted taken path may already be stored in the same trace as the branch within trace cache 160. Additionally, in embodiments in which instructions are stored in trace cache 160 in at least partially decoded form, fetching instructions from the trace cache may allow the decode unit 140 to be at least partially bypassed, resulting in a decreased number of dispatch cycles for the cached instructions. Accordingly, the trace cache 160 may allow the time taken to partially (or fully) decode the cached instructions to be amortized over several execution iterations when traces are executed more than once.

Note that processor 100 may include and/or be coupled to many other components in addition to those shown here. For example, additional levels of cache may be included (internal and/or external to processor 100) between processor 100 and system memory 200. Similarly, processor 100 may include an integrated memory controller configured to control system memory 200 in some embodiments. Additionally, the interconnections between logical components may vary between embodiments.

Trace Cache

Figure 2:
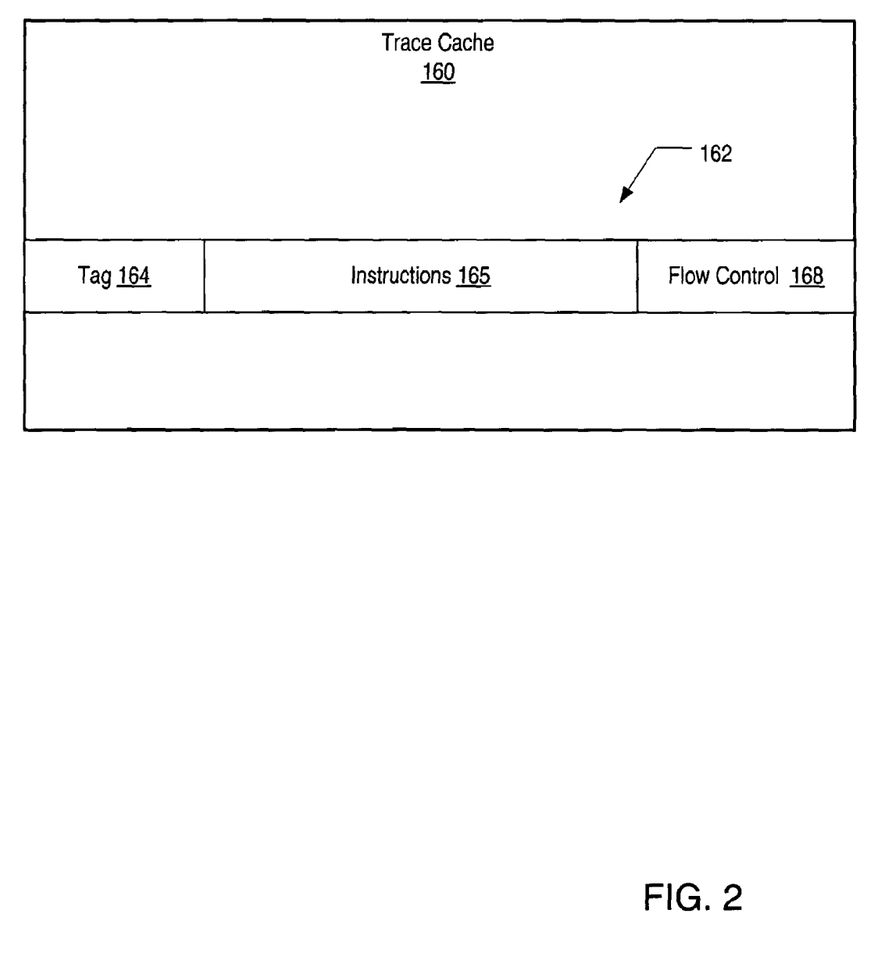
FIG. 2 is a block diagram of a trace cache, according to one embodiment.

FIG. 2 illustrates an exemplary trace cache 160, according to one embodiment. The trace cache 160 may include several entries 162. Each entry 162 stores a trace that includes several instructions 165. The instructions 165 in a trace may not be stored in program order. For example, an entry 162 may store both a branch instruction and the instruction that is the destination of the branch when the branch is taken (as opposed to the instruction that follows the branch in program order). In some embodiments, the instructions 165 in each trace cache entry 162 may be stored in at least partially decoded form. As used herein, the term "trace" is used to refer to a group of one or more instructions stored in a single trace cache entry 162.

Looking back at FIG. 1, note that processing of an instruction stream fetched from the trace cache 160 may differ from processing of an instruction stream fetched from instruction cache 106. The instruction stream from instruction cache 106 may include information identifying instruction boundaries, even after instructions are decoded into one or more component operations. This boundary information may be used by retire queue 102 to determine when the operation(s) corresponding to a particular instruction may retire. Typically, the retire queue 102 operates to retire operations in original program order. Operation(s) corresponding to the same instruction may be retired at the same time.

In contrast, the instruction stream from trace cache 160 may not include information identifying instruction boundaries if the instructions have been decoded and/or modified (e.g., by combining instructions to increase storage efficiency within trace cache 160) prior to storage in trace cache 160. Consequentially, retire queue 102 may have to retire instructions included in such an instruction stream on a courser granularity. For example, in some embodiments, retire queue 102 may not retire any instructions included in a trace until all instructions in that trace are ready to retire.

One problem that may arise in some trace-cache-based processors is that certain instructions, referred to herein as "exceptional" instructions, may require special handling that affects when those instructions can be retired. Since retirement of the other instructions (including those that occur earlier in program order) in the same trace as an exceptional instruction may depend on the exceptional instruction being ready to retire, such an exceptional instruction may block the retirement of the other instructions in the trace. In some situations, if non-retirement of the exceptional instruction may block the retirement of older operations included in the same trace, the processor may become deadlocked. Additionally, if an exceptional instruction blocks the retirement of other instructions in the same trace due to the lack of instruction boundary information provided from the trace cache, all of the non-retirable instructions (and any younger instructions, in program order, that have already been dispatched) in that trace may have to be re-fetched from the instruction cache and re-executed.

Exceptional instructions include those that generate exceptions or interrupts. An exceptional instruction may have the potential to take significantly longer to complete relative to non-exceptional instructions. For example, execution core 124 may complete a typical non-exceptional instruction in one to three execution cycles. In contrast, an exceptional instruction may generate an interrupt that takes 10 times as many execution cycles (or more) to execute. With at least some exceptional instructions, it may be beneficial or even required that all of the instructions older (in program order) than a particular exceptional instruction be able to retire independently of that exceptional instruction. As noted above, the lack of instruction boundary information in a trace may reduce or eliminate the ability of different instructions in the same trace to be retired independently. Accordingly, the inclusion of an exceptional instruction in a trace with other instructions may ultimately result in all of the instructions in that trace having to be re-fetched from instruction cache in order to obtain the boundary information.

In order to reduce the likelihood of an exceptional instruction blocking the retirement of the other instructions and/or causing other instructions to be discarded, re-fetched, and re-executed, trace generator 170 may be configured to detect exceptional instructions and to not store such instructions in a trace that includes any other instructions. In some embodiments, trace generator 170 may store a detected exceptional instruction in a trace that only includes that exceptional instruction. While such an arrangement may decrease trace cache storage efficiency, it may allow fetching to continue from the trace cache instead of causing fetching to switch between the instruction cache 106 and trace cache 160. In other embodiments, trace generator 170 may not store detected exceptional instructions in trace cache 160 at all, causing the exceptional instructions to always be fetched from instruction cache 106. Trace generator 170 is an example of a means for storing a group of instructions in a trace cache entry within a trace cache.

Trace generator 170 may detect exceptional instructions by examining each candidate instruction for storage in the trace cache for certain opcodes, operands, addressing modes, and other characteristics. In one embodiment, identifying characteristic(s) of potentially exceptional instructions may be programmed into the trace generator 170. Note that in such embodiments, the trace generator 170 may be configured to always identify certain types of instructions as exceptional instructions, even if those types of operations may be executable without special handling under certain circumstances. In some embodiments, decode unit 140 may generate tags identifying exceptional instructions during instruction decode. Each tag may be passed through the processor 100 along with the decoded instruction identified as being exceptional by that tag. Accordingly, instead of (or in addition to) independently determining whether decoded instructions are exceptional, trace generator 170 may rely on the tags generated by decode unit 140 to identify exceptional instruction. Thus, both trace generator 170 and decode unit 140 are examples of means for detecting an exceptional instruction within the group of instructions.

In response to detecting an exceptional instruction in a stream of instructions being stored in the trace cache 160, trace generator 170 may end the storage of instructions into the current trace (even if room is available to store additional instructions within that trace). If trace generator is configured to store exceptional instructions in a stand-alone trace within trace cache 160, the trace generator may allocate a new trace cache entry to store the exceptional instruction. The trace generator 170 may store the next instruction that occurs just after the exceptional instruction in program order in yet another trace cache entry. If the trace generator 170 is instead configured to exclude exceptional instructions from the trace cache 160 altogether, the trace generator may simply end the current trace upon detection of the exceptional instruction (unless no other older instructions have already been stored in the current trace) and begin storing the next non-exceptional instruction, in program order, that is a candidate for storage in the trace cache in the next trace. Note that the trace generator 170 may set flow information in the current trace to indicate that the exceptional instruction is the next instruction to fetch. Accordingly, in response to that trace being fetched, prefetch unit 170 may be configured to prefetch the instruction identified in the flow information from instruction cache 106. Thus, the execution stream will switch from the trace cache 160 to the instruction cache 106 due to the exclusion of the exceptional instruction from the trace cache 160.

Some exceptional instructions may not be detectable by trace generator 170. For example, some instructions may behave differently each time those instructions are executed. Because of the nature of these instructions (e.g., such instructions may rarely be exceptional), trace generator 170 may be configured to not automatically identify those instructions as exceptional. As a result, these exceptional instructions may be stored in a trace with other instructions by trace generator 170. In order to prevent the inclusion of such exceptional instructions from causing problems due to blocked retirement of other instructions in the same trace, restart logic 190 may monitor how many clock cycles have passed since retire queue 102 last retired any operations. If no operations have been retired in a predetermined number of clock cycles, restart logic 190 may restart execution of processor 100 from instruction cache 106. In one embodiment, restart logic 190 may restart execution by flushing the processing pipeline and re-fetching the instructions beginning with the oldest outstanding non-retired instruction within the processor 100. When the instructions are fetched from instruction cache 106, information about instruction boundaries will be available to retire queue 102. Accordingly, if the non-retirement detected by restart logic 190 is caused by an exceptional instruction that blocked retirement of a trace, fetching the instructions from instruction cache 106 may allow the retire queue 102 to retire the problematic exceptional instruction independently without unnecessarily blocking the retirement of other instructions.

Certain instructions may not be re-executable, and thus such instructions may be incorrect if they are executed from trace cache 160, blocked from retirement by an exceptional instruction included in the same trace, and then re-executed due to the operation of restart logic 190. For example, performance of certain loads (e.g., some I/O loads) may modify the value being read. In order to avoid problems that may arise if such instructions are re-executed, trace generator 170 may be configured to identify these instructions as another class of exceptional instructions that are not stored in traces with other instructions. Thus, the trace generator 170 may either exclude these exceptional instructions from the trace cache 160 or store these exceptional instructions in stand-alone traces that do not include any other instructions (e.g., as described above with respect to exceptional instructions in general).

Like certain other exceptional instructions, some non-re-executable instructions may not be detectable by trace generator 170. For example, a load may access a system memory 200 address during one program iteration and an I/O register the next iteration. After the first iteration, the load may be stored in a trace. During the next iteration, the load may be non-re-executable due to the nature of the read to the I/O register. Accordingly, if another instruction in the same trace as the load is exceptional (e.g., if another instruction generates a page fault), retirement of the trace may be delayed for long enough to trigger restart logic 190. However, this could unacceptably cause the load to be re-executed. In order to avoid this situation, dispatch unit 104 or another component within processor 100 may be configured to identify the load as having become non-re-executable at some point before the load is actually executed. In response to detection of a non-re-executable instruction within a group of instructions fetched from trace cache 160, restart logic 190 may cause the processor pipeline to be flushed (prior to execution of the non-re-executable instruction) and restart execution from instruction cache 106.

Exemplary Trace

Figure 3A:
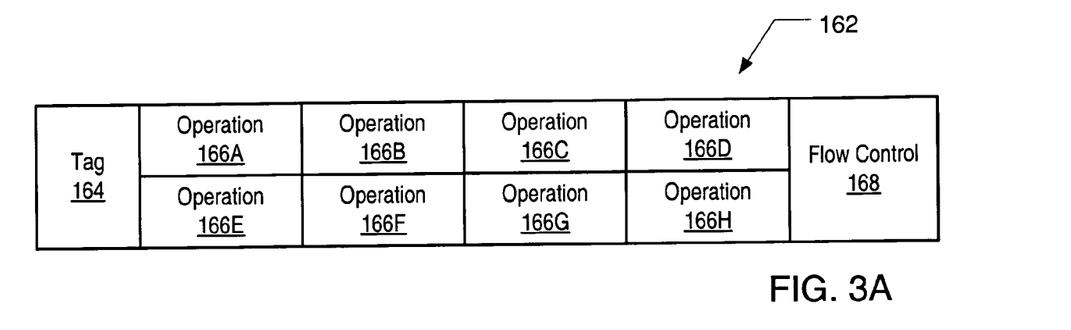
FIG. 3A illustrates an exemplary trace cache entry, according to one embodiment.

FIG. 3A illustrates one embodiment of a trace cache entry 162 configured to store at least partially decoded instructions. In the embodiment of FIG. 3A, a trace cache entry 162 may store up to eight component operations included in a group of decoded and/or partially decoded instructions in operation storage units 166A–166H. Note that other embodiments may include fewer or additional operation storage units 166, allowing storage of different numbers of operations within each trace cache entry 162.

Certain operation storage units 166 within a trace cache entry 162 may be reserved for certain types of operations. For example, in one embodiment, operation storage units 166A–166D may be used to store memory operations. Similarly, operation storage units 166E–166H may be used to store data operations. Note that other embodiments may associate certain types of operations with certain operation storage units differently (or not at all).

In addition to including several operation storage units 166, each trace cache entry 162 also includes an identifying tag 164 and flow control information 168. Tag 164 may be similar to a tag in instruction cache 106, allowing prefetch unit 108 to determine whether a given operation hits or misses in trace cache 160. For example, tag 164 may include all or some of the address bits identifying an instruction within the trace cache entry (e.g., the tag may include the address of the earliest instruction, in program order, stored within that trace). In some embodiments, the tag may include enough information that the address of each instruction (or at least the earliest instruction within each liveness group, described in more detail below) may be independently identified using the information stored in the trace. In other embodiments, only the address of the earliest instruction within a trace may be available.

In the illustrated embodiment, each trace may include up to two branch instructions. Other embodiments may include fewer or additional branch instructions within each trace. Flow control information 168 may include a label for each branch instruction included within the trace. The label may be an indication identifying the address to which control should branch depending on the resolution (taken, not taken) of a respective branch. Thus, each item of flow control information 168 may be associated with a particular branch operation. For example, in one embodiment, one flow control information storage location within a trace may be associated with the first branch operation in the trace and the other flow control information storage location may be associated with the second branch in the trace. Alternatively, the flow control information may include tags or other information identifying the branch operation with which that flow control information is associated. In yet other embodiments, a branch prediction and/or information identifying which flow control information corresponds to a branch operation may be stored with that branch operation within operation storage 166.

Providing Increased Retirement Granularity within Traces

As mentioned previously, there may be limited information about instruction boundaries within a trace. For example, if instructions are partially decoded into their component operations prior to storage in a trace, no information delineating the different instructions in that trace may be included in the trace. Furthermore, if after being decoded, component operations of different instructions are combined, reordered, and/or modified, it may be even more difficult to identify instruction boundaries.

In order to provide increased instruction boundary information within a trace, decoded instructions within a trace may be subdivided into different liveness groups. Trace generator 170 may tag each decoded instruction stored within a particular trace cache entry as belonging to a particular liveness group within that trace. Information about the instruction boundaries of decoded instructions within each liveness group may be unavailable. However, the liveness groups themselves may be created such that decoded instructions may be retired on liveness group boundaries.

Each operation 166 within a trace may have an associated liveness indication. Each operation's liveness indication may be stored with its associated operation in one of operation storage units 166. Liveness indications identify the liveness group in which each operation belongs. Each liveness group is a group of operations within the trace that are part of the same basic block. For example, the operations up to and including the first branch operation, in program order, within the trace may be included in one liveness group. Operations whose execution is dependent on the resolution of the first branch operation may be included in another liveness group. Thus, a liveness group is similar to a basic block in that operations in the same liveness group will either all be executed or all not be executed. A liveness group differs from a basic block in that operations in the same basic block may be included in different traces (e.g., some operations within the basic block may be included in the final liveness group within one trace and the remaining operations in that basic block may be included in the first liveness group in another trace). Thus, operations within the same liveness group are necessarily part of the same basic block, but operations within the same basic block may not necessarily be part of the same liveness group (i.e., if that basic block spans more than one trace cache entry).

The liveness indications identify each operation's program order relative to the branch operation(s) included in the same trace cache entry. Operations in a first liveness group are not dependent on the outcome of the first branch operation within the trace. Note that since execution of the first branch operation is not conditional, the first branch operation is part of the first liveness group. These operations in the first liveness group may be identified with a different liveness indication than is used to identify a second liveness group of operations that occur after the first branch operation. Similarly, instructions in a third liveness group that depend on the outcomes of both the first branch operation and a second branch operation (i.e., the final operation included in the second liveness group) may be identified with yet another liveness indication. Liveness indications allow operations to be stored within a trace cache entry 162 in an order that differs from their program order while still allowing the program order (relative to the branch operations) of the operations to be determined.

Additionally, liveness indications allow dispatch unit 104 to predict which operations within a particular trace will be executed. Operations in the first liveness group (i.e., operations that are not dependent on the first branch included in a trace) will always be executed (assuming any operations at all within the trace execute). However, execution of operations in the second liveness group (i.e., operations that depend on the first branch) depends on the outcome of the first branch. For example, in embodiments where the trace generator 170 is included at the back-end of the processing pipeline of processor 100, operations may be stored in traces according to the order in which those operations executed so that if the operations are subsequently executed again, they may be accessed from the trace cache instead of from the instruction cache. Thus, if the first branch stored within the trace was taken the first time that branch executed, the operations stored in the second liveness group may be the operations that should be executed if the first branch is taken. Accordingly, if the trace is later provided to dispatch unit 104 and the current branch prediction for the first branch is "not taken," the dispatch unit 104 may predict that the operations in the second liveness group should not be executed. The flow control information 168 associated with the first branch operation may also be used to begin prefetching instructions or traces that should be executed if the first branch is not taken.

Figure 3B:
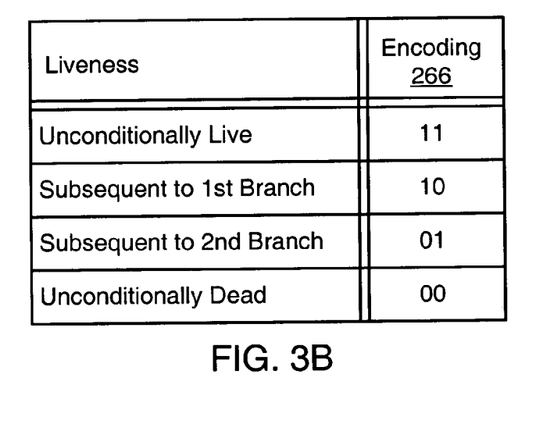
FIG. 3B is a table of liveness encodings that may be used to identify the liveness group in which each operation in a trace belongs, according to one embodiment.

FIG. 3B shows exemplary liveness encodings that may be used in one embodiment. The first liveness encoding, "unconditionally live," may be used to identify the first (in program order) liveness group within the trace. Operations in this liveness group are unconditionally live in the sense that, if the trace is executed, these operations will always be executed. The first liveness group may include a branch operation as the final operation (in program order) within that liveness group. These operations are not dependent on any branch operations included within the same trace. In many embodiments, these operations may be stored in any order relative to each other within the trace.

The next liveness encoding, "subsequent to first branch" is used to identify the second (in program order) liveness group within the trace. These operations are dependent on the outcome of the first branch operation, which is included in the previous liveness group. Note that if any operations within this liveness group are non-speculatively executed, all operations within this liveness group will be executed.

The third liveness encoding, "subsequent to second branch" is used to identify the third (in program order) basic block within the trace. These operations are dependent on the outcome of both the first and the second branch operations within the trace. Thus, these operations may not execute even if operations having the second liveness encoding execute. As above, if any operations within this liveness group are non-speculatively executed, all operations within this liveness group will be executed.

The "unconditionally dead" liveness encoding may be used to identify an unused operation storage unit 166. Operation storage units 166 may be unused if more than the maximum number of branch operations occur within a set of operations. For example, if up to eight operations can be stored in a trace and if only two branch operations can be stored in a trace, then fewer than eight operations may be stored in a trace if a given set of eight operations includes three branch operations. Thus, if a maximum limit is placed on the number N of branch operations that may be stored within a trace, storage of the Nth branch operation in the trace may end the trace. Furthermore, in some embodiments, if a certain operation is stored within a trace, subsequent operations (in program order) may not be stored within the trace, even if operation storage is available. For example, subroutine call operations may end a trace (e.g., so that the first operation within the subroutine may be stored as the first operation within another trace, allowing the tag of that operation to be used as a trace tag). Similarly, subroutine return operations may end a trace.

Looking back at FIG. 1, trace generator 170 may be configured to generate the appropriate liveness encoding for each operation and to store that liveness encoding within the same operation storage unit 166 as the operation within a trace cache entry 162 in trace cache 160. Trace generator 170 may generate liveness encodings for each operation based on information about the outcome of each branch the first time each branch operation was executed. This information may be provided from retire queue 102. Additional information may be provided from branch prediction unit 132 identifying the predicted outcome and/or the success of each prediction for each branch in one or more prior executions.

When instructions are fetched from trace cache 160, the liveness encoding associated with each operation may be propagated through the processor along with the instruction. The retire queue 102 may use the liveness encoding for each operation to determine the boundaries on which operations may be retired. For example, instead of blocking the retirement of operations in a trace any all of the operations in that trace are ready for retirement, the retire queue 102 may retire a subset of the operations in the trace as soon as all of the operations in the same liveness group within that trace are ready for retirement. In some embodiments, this increased retirement granularity may decrease the likelihood that restart logic 190 will need to restart execution due to blocked retirement.

Figure 4:
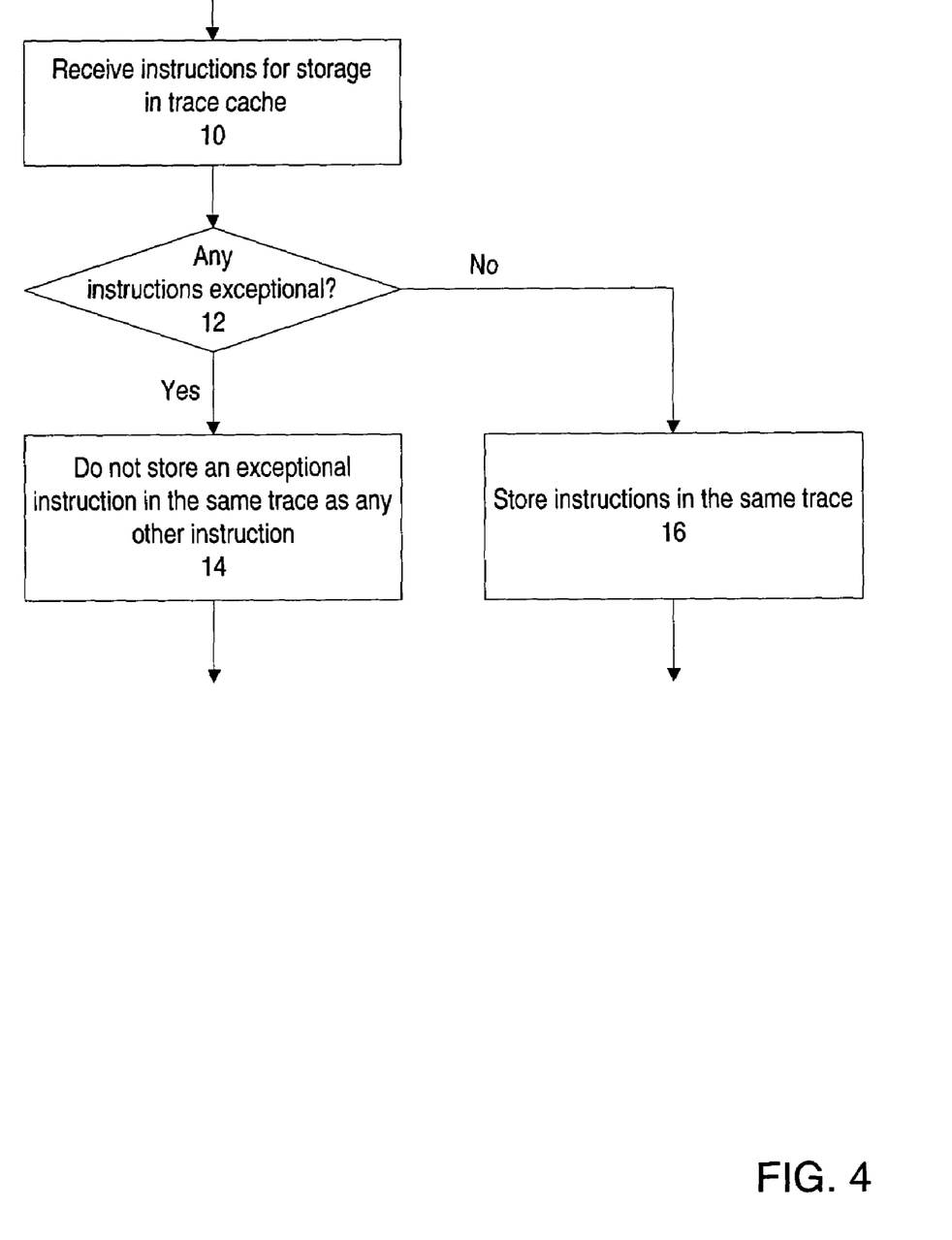
FIG. 4 is a flowchart of one embodiment of a method of generating traces for storage in a trace cache, according to one embodiment.

FIG. 4 illustrates one embodiment of a method of generating traces for storage in a trace cache. At 10, one or more instructions are received for storage in the trace cache. If any of the instructions are exceptional (e.g., if any instructions are likely to cause an exception or if any instructions are unable to be re-executed), the exceptional instructions may not be stored in the same trace as any other instruction, as indicated at 12 and 14. If none of the instruction(s) received at 10 are exceptional, those instructions may be stored together in the same trace and/or included in the same trace as additional non-exceptional instructions, as indicated at 12 and 16.

Figure 5:
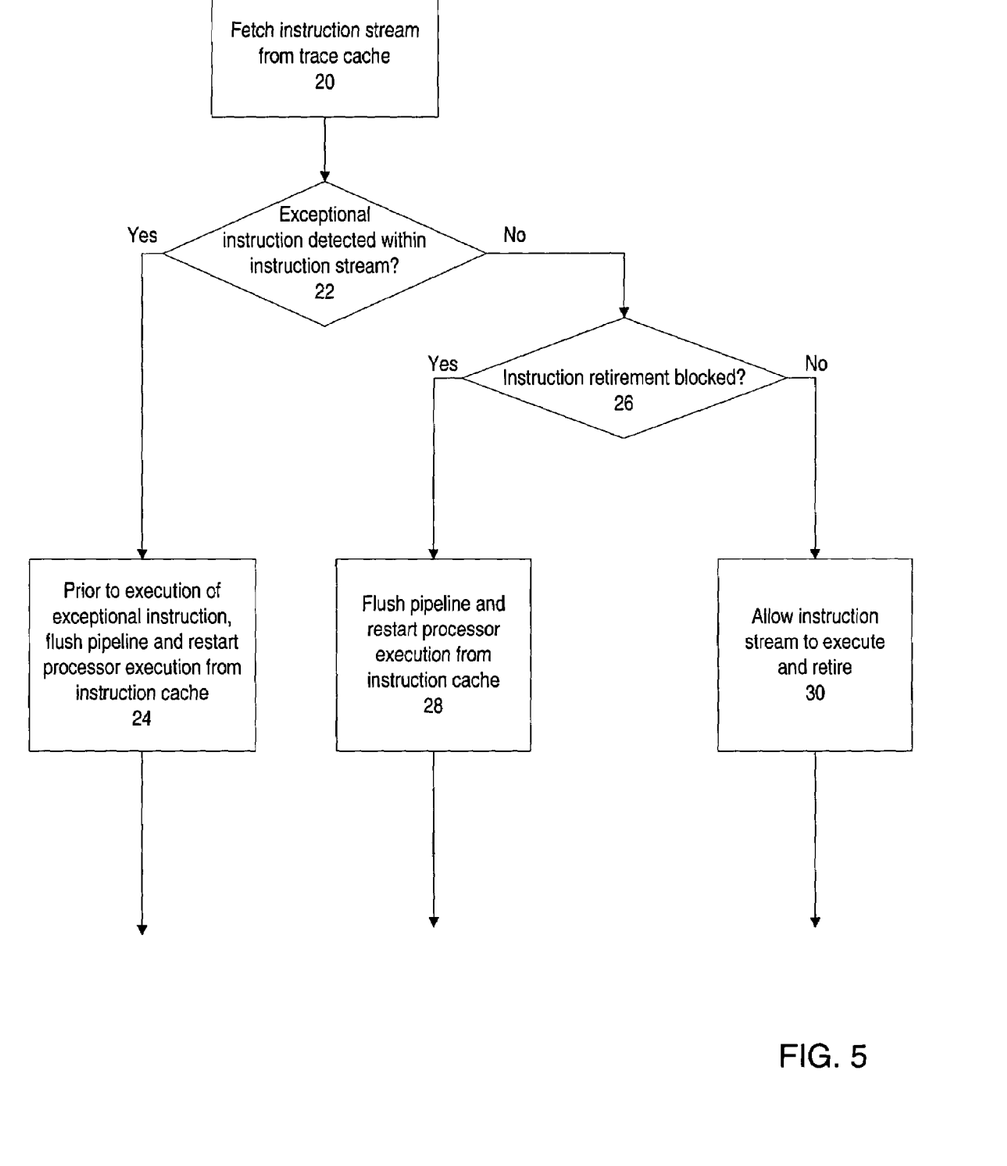
FIG. 5 is a flowchart of one embodiment of a method of executing a trace that includes an exceptional instruction, according to one embodiment.

FIG. 5 is a flowchart of one embodiment of a method of handling undetected exceptional instructions that are inadvertently included in a trace within the trace cache. At 20, an instruction stream is fetched from the trace cache. If an exceptional instruction is detected within the fetched instruction stream, as determined at 22, the pipeline may be flushed and processor execution may be restarted from the instruction cache, as indicated at 24.

Some exceptional instructions within the instruction stream may not be detected at 22. If such an instruction causes an exception, which in turn blocks retirement of the other instructions in the same trace as the exceptional instruction, the processor pipeline may be flushed and execution may be restarted from the instruction cache, as indicated at 26 and 28. Determining whether instruction retirement is blocked may involve monitoring instruction retirement. If no instructions are retired for a predetermined number of cycles, retirement may be identified as being blocked. If instruction retirement is not blocked, the instruction stream fetched from the trace cache may be allowed to execute and retire, as indicated at 26 and 30.

Exemplary Computer Systems

Figure 6:
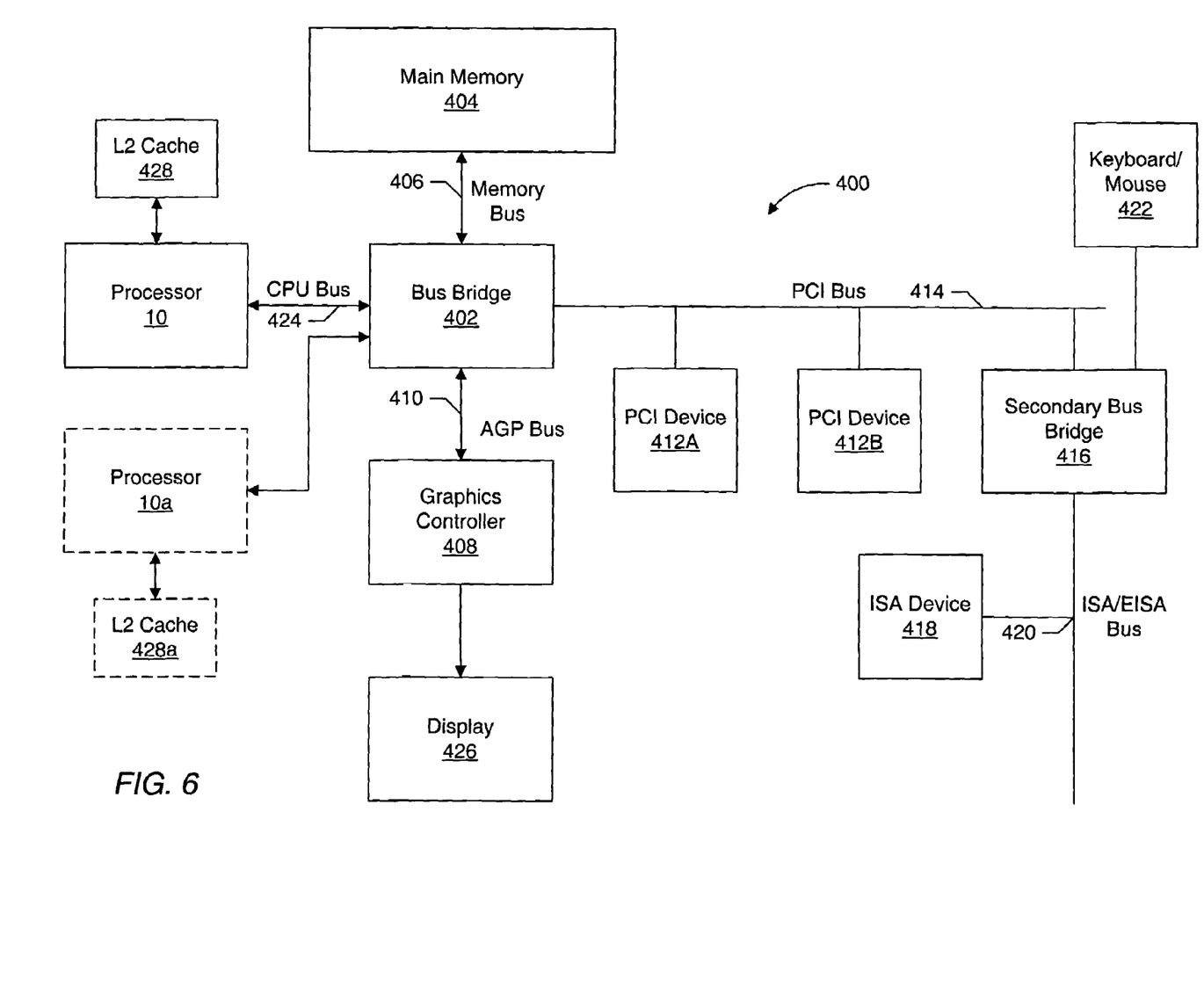
FIG. 6 shows a block diagram of a computer system, according to one embodiment.

FIG. 6 shows a block diagram of one embodiment of a computer system 400 that includes a processor 100 coupled to a variety of system components through a bus bridge 402. Processor 100 may include a dispatch unit 104, a trace cache 160, retire queue 102, restart logic 190, and/or a trace cache generator 170 as described above. Other embodiments of a computer system are possible and contemplated. In the depicted system, a main memory 200 is coupled to bus bridge 402 through a memory bus 406, and a graphics controller 408 is coupled to bus bridge 402 through an AGP bus 410. Several PCI devices 412A–412B are coupled to bus bridge 402 through a PCI bus 414. A secondary bus bridge 416 may also be provided to accommodate an electrical interface to one or more EISA or ISA devices 418 through an EISA/ISA bus 420. In this example, processor 100 is coupled to bus bridge 402 through a CPU bus 424 and to an optional L2 cache 428. In some embodiments, the processor 100 may include an integrated L1 cache (not shown).

Bus bridge 402 provides an interface between processor 100, main memory 404, graphics controller 408, and devices attached to PCI bus 414. When an operation is received from one of the devices connected to bus bridge 402, bus bridge 402 identifies the target of the operation (e.g., a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may incorporate additional functionality. An input/output controller (not shown), either external from or integrated with secondary bus bridge 416, may also be included within computer system 400 to provide operational support for a keyboard and mouse 422 and for various serial and parallel ports. An external cache unit (not shown) may also be coupled to CPU bus 424 between processor 100 and bus bridge 402 in other embodiments. Alternatively, the external cache may be coupled to bus bridge 402 and cache control logic for the external cache may be integrated into bus bridge 402. L2 cache 428 is shown in a backside configuration to processor 100. It is noted that L2 cache 428 may be separate from processor 100, integrated into a cartridge (e.g., slot 1 or slot A) with processor 100, or even integrated onto a semiconductor substrate with processor 100.

Main memory 200 is a memory in which application programs are stored and from which processor 100 primarily executes. A suitable main memory 200 may include DRAM (Dynamic Random Access Memory). For example, a plurality of banks of SDRAM (Synchronous DRAM) or Rambus DRAM (RDRAM) may be suitable.

PCI devices 412A–412B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures that can be effectively shifted into and from main memory 200. Graphics controller 408 may therefore be a master of AGP bus 410 in that it can request and receive access to a target interface within bus bridge 402 to thereby obtain access to main memory 200. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional processors (e.g., processor 100a shown as an optional component of computer system 400). Processor 100a may be similar to processor 100. More particularly, processor 100a may be an identical copy of processor 100 in one embodiment. Processor 100a may be connected to bus bridge 402 via an independent bus (as shown in FIG. 6) or may share CPU bus 224 with processor 100. Furthermore, processor 100a may be coupled to an optional L2 cache 428a similar to L2 cache 428.

Figure 7:
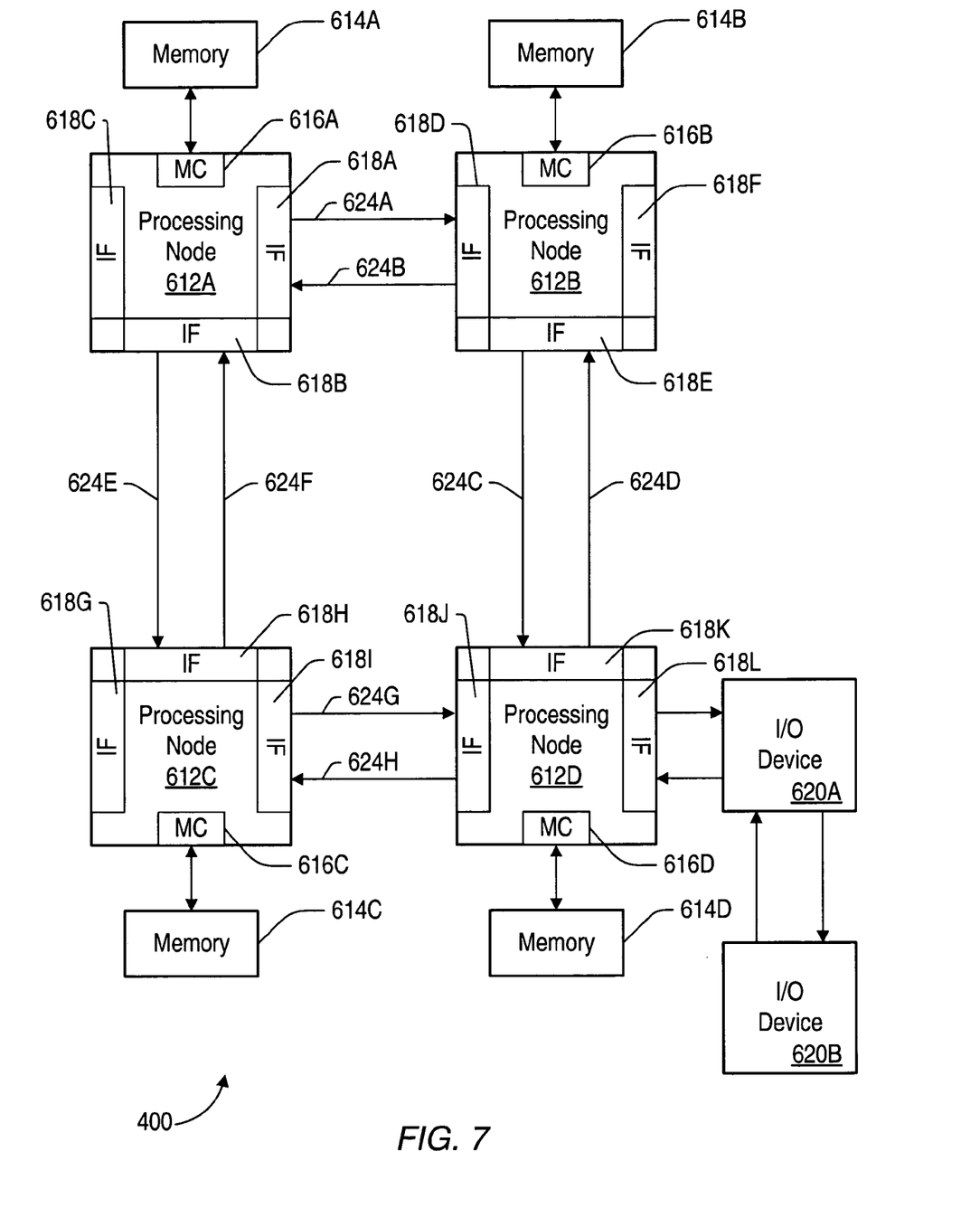
FIG. 7 is a block diagram of a computer system, according to another embodiment.

Turning now to FIG. 7, another embodiment of a computer system 400 is shown. Other embodiments are possible and contemplated. In the embodiment of FIG. 7, computer system 400 includes several processing nodes 612A, 612B, 612C, and 612D. Each processing node is coupled to a respective memory 614A–614D via a memory controller 616A–616D included within each respective processing node 612A–612D. Additionally, processing nodes 612A–612D include interface logic used to communicate between the processing nodes 612A–612D. For example, processing node 612A includes interface logic 618A for communicating with processing node 612B, interface logic 618B for communicating with processing node 612C, and a third interface logic 618C for communicating with yet another processing node (not shown). Similarly, processing node 612B includes interface logic 618D, 618E, and 618F; processing node 612C includes interface logic 618G, 618H, and 618I; and processing node 612D includes interface logic 618J, 618K, and 618L. Processing node 612D is coupled to communicate with a plurality of input/output devices (e.g., devices 620A–620B in a daisy chain configuration) via interface logic 618L. Other processing nodes may communicate with other I/O devices in a similar fashion.

Processing nodes 612A–612D implement a packet-based link for inter-processing node communication. In the present embodiment, the link is implemented as sets of unidirectional lines (e.g., lines 624A are used to transmit packets from processing node 612A to processing node 612B and lines 624B are used to transmit packets from processing node 612B to processing node 612A). Other sets of lines 624C–624H are used to transmit packets between other processing nodes as illustrated in FIG. 7. Generally, each set of lines 624 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 612A to processing node 612D may pass through either processing node 612B or processing node 612C as shown in FIG. 7. Any suitable routing algorithm may be used. Other embodiments of computer system 400 may include more or fewer processing nodes then the embodiment shown in FIG. 7.

Generally, the packets may be transmitted as one or more bit times on the lines 624 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 612A–612D, in addition to a memory controller and interface logic, may include one or more processors. Broadly speaking, a processing node includes at least one processor and may optionally include a memory controller for communicating with a memory and other logic as desired. More particularly, each processing node 612A–612D may include one or more copies of processor 100. Processing nodes 612 may each include a processor 100 that includes a dispatch unit 104, a trace cache 160, retire queue 102, restart logic 190, and/or a trace cache generator 170 as described above. External interface unit 18 may includes the interface logic 618 within the node, as well as the memory controller 616.

Memories 614A–614D may include any suitable memory devices. For example, a memory 614A–614D may include one or more RAMBUS DRAMs (RDRAMs), synchronous DRAMs (SDRAMs), static RAM, etc. The address space of computer system 400 is divided among memories 614A–614D. Each processing node 612A–612D may include a memory map used to determine which addresses are mapped to which memories 614A–614D, and hence to which processing node 612A–612D a memory request for a particular address should be routed. In one embodiment, the coherency point for an address within computer system 400 is the memory controller 616A–616D coupled to the memory storing bytes corresponding to the address. In other words, the memory controller 616A–616D is responsible for ensuring that each memory access to the corresponding memory 614A–614D occurs in a cache coherent fashion. Memory controllers 616A–616D may include control circuitry for interfacing to memories 614A–614D. Additionally, memory controllers 616A–616D may include request queues for queuing memory requests.

Interface logic 618A–618L may include a variety of buffers for receiving packets from the link and for buffering packets to be transmitted upon the link. Computer system 400 may employ any suitable flow control mechanism for transmitting packets. For example, in one embodiment, each interface logic 618 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 620A–620B may be any suitable I/O devices. For example, I/O devices 620A–620B may include devices for communicate with another computer system to which the devices may be coupled (e.g., network interface cards or modems). Furthermore, I/O devices 620A–620B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

As used herein, the terms "clock cycle" or "cycle" refer to an interval of time in which the various stages of the instruction processing pipelines complete their tasks. Instructions and computed values are captured by memory elements (such as registers or arrays) according to a clock signal defining the clock cycle. For example, a memory element may capture a value according to the rising or falling edge of the clock signal.

Numerous variations and modifications will become apparent to those skilled in the art once the above disclosure is fully appreciated. It is intended that the following claims be interpreted to embrace all such variations and modifications.

What is claimed is:

1. A system, comprising:
  an instruction cache;
  a trace cache including a plurality of trace cache entries; and
  a trace generator coupled to the instruction cache and the trace cache;
  wherein the trace generator is configured to receive a group of instructions output by the instruction cache for storage in one of the plurality of trace cache entries, wherein the trace generator is configured to detect an exceptional instruction within the group of instructions, and wherein the trace generator is configured to store the exceptional instruction in a different trace cache entry than any non-exceptional instructions.

2. The system of claim 1, wherein the trace generator is configured to store instructions in the trace cache in at least partially decoded form.

3. The system of claim 2, further comprising a retire queue coupled to retire executed instructions, wherein the retire queue is configured to prevent retirement of any instruction fetched from the trace cache until all instructions included in a same trace cache entry as that instruction are ready for retirement.

4. The system of claim 3, further comprising restart logic configured to monitor a number of cycles elapsed since the retire queue last retired an instruction, wherein if the number of cycles exceeds a threshold number, the restart logic is configured to flush a processing pipeline executing instructions fetched from the trace cache and to restart execution from the instruction cache.

5. The system of claim 4, further comprising a dispatch unit configured to dispatch instructions received from the trace cache, wherein the dispatch unit is configured to detect a non-re-executable instruction within a group of instructions received from the trace cache and to provide an indication of the non-re-executable instruction to the restart logic;
  wherein in response to the indication, the restart logic is configured to flush the processing pipeline and to restart execution from the instruction cache prior to execution of the non-re-executable instruction.

6. The system of claim 2, further comprising a dispatch unit configured to dispatch instructions received from the instruction cache, wherein the dispatch unit is configured to detect the exceptional instruction within a group of instructions received from the instruction cache and to provide an indication of the exceptional instruction to the trace generator, wherein the trace generator is configured to detect the exceptional instruction in response to the indication from the dispatch unit.

7. The system of claim 2, wherein the trace generator is configured to detect the exceptional instruction in response to a characteristic of the exceptional instruction.

8. The system of claim 2, wherein the exceptional instruction is an instruction that causes an interrupt or exception.

9. The system of claim 2, wherein the trace generator is configured to not store any other instructions with the exceptional instruction in the different trace cache entry.

10. The system of claim 2, wherein the exceptional instruction is a non-re-executable instruction.

11. The system of claim 2, further comprising a retire queue coupled to retire executed instructions, wherein the retire queue is configured to prevent retirement of any instruction fetched from the trace cache until all instructions included in a same liveness group within a same trace cache entry as that instruction are ready for retirement.

12. A method, comprising:
  receiving a group of instructions for storage in a trace cache entry within a trace cache;
  storing one or more instructions included in the group of instructions in the trace cache entry;
  detecting an exceptional instruction within the group of instructions; and
  in response to said detecting, storing the exceptional instruction in a different trace cache entry than any non-exceptional instructions.

13. The method of claim 12, wherein said storing comprises storing the one or more instructions in the trace cache entry in at least partially decoded form.

14. The method of claim 13, further comprising preventing retirement of any instruction fetched from the trace cache until all instructions included in a same trace cache entry as that instruction are ready for retirement.

15. The method of claim 14, further comprising:
  monitoring a number of cycles elapsed since retirement of any instruction; and
  if the number of cycles exceeds a threshold number, flushing a processing pipeline executing instructions fetched from the trace cache and restarting execution from the instruction cache.

16. The method of claim 14, further comprising:
  detecting a non-re-executable instruction within a group of instructions fetched from the trace cache; and
  in response to said detecting the non-re-executable instruction, flushing the processing pipeline and restarting execution from the instruction cache prior to execution of the non-re-executable instruction.

17. The method of claim 13, further comprising dispatching instructions received from the instruction cache, wherein said detecting the exceptional instruction is performed during said dispatching.

18. The method of claim 13, wherein said detecting comprises a trace generator detecting the exceptional instruction in response to a characteristic of the exceptional instruction.

19. The method of claim 13, wherein the exceptional instruction is an instruction that causes an interrupt or exception.

20. The method of claim 13, further comprising preventing any other instructions from being stored with the exceptional instruction in the different trace cache entry.

21. The method of claim 13, wherein the exceptional instruction is a non-re-executable instruction.

22. The method of claim 13, further comprising preventing retirement of any instruction fetched from the trace cache until all instructions included in a same liveness group within a same trace cache entry as that instruction are ready for retirement.

23. A computer system, comprising:
a system memory; and
a processor coupled to the system memory, wherein the processor includes:
an instruction cache;
a trace cache including a plurality of trace cache entries; and
a trace generator coupled to the instruction cache and the trace cache;
wherein the trace generator is configured to receive a group of instructions output by the instruction cache for storage in one of the plurality of trace cache entries, wherein the trace generator is configured to detect an exceptional instruction within the group of instructions, and wherein the trace generator is configured to store the exceptional instruction in a different trace cache entry than any non-exceptional instructions.

24. The computer system of claim 23, wherein the trace generator is configured to store instructions in the trace cache in at least partially decoded form.

25. The computer system of claim 24, further comprising a retire queue coupled to retire executed instructions, wherein the retire queue is configured to prevent retirement of any instruction fetched from the trace cache until all instructions included in a same trace cache entry as that instruction are ready for retirement.

26. The computer system of claim 25, further comprising restart logic configured to monitor a number of cycles elapsed since the retire queue last retired an instruction, wherein if the number of cycles exceeds a threshold number, the restart logic is configured to flush a processing pipeline executing instructions fetched from the trace cache and to restart execution from the instruction cache.

27. The computer system of claim 26, further comprising a dispatch unit configured to dispatch instructions received from the trace cache, wherein the dispatch unit is configured to detect a non-re-executable instruction within a group of instructions received from the trace cache and to provide an indication of the non-re-executable instruction to the restart logic;
wherein in response to the indication, the restart logic is configured to flush the processing pipeline and to restart execution from the instruction cache prior to execution of the non-re-executable instruction.

28. The computer system of claim 24, wherein the exceptional instruction is an instruction that causes an interrupt or exception.

29. The computer system of claim 24, further comprising a retire queue coupled to retire executed instructions, wherein the retire queue is configured to prevent retirement of any instruction fetched from the trace cache until all instructions included in a same liveness group within a same trace cache entry as that instruction are ready for retirement.

30. A system, comprising:
means for storing a group of instructions in a trace cache entry within a trace cache;
means for detecting an exceptional instruction within th& group of instructions; and
wherein in response to said detecting, the means for storing store the exceptional instruction in a different trace cache entry than any non-exceptional instructions.

* * * * *